United States Patent

Kuznicki et al.

[11] Patent Number: 6,068,682
[45] Date of Patent: May 30, 2000

[54] SMALL-PORED CRYSTALLINE TITANIUM MOLECULAR SIEVE ZEOLITES AND THEIR USE IN GAS SEPARATION PROCESSES

[75] Inventors: Steven M. Kuznicki, Whitehouse Station; Valerie A. Bell, Edison; Ivan Petrovic, Princeton; Bipin T. Desai, Edison, all of N.J.

[73] Assignee: Engelhard Corporation, Iselin, N.J.

[21] Appl. No.: 09/210,631

[22] Filed: Dec. 11, 1998

Related U.S. Application Data

[63] Continuation-in-part of application No. 08/995,983, Dec. 22, 1997, abandoned.

[51] Int. Cl.$^7$ ............................................. B01D 53/04
[52] U.S. Cl. ............................ 95/130; 95/96; 95/117; 95/138; 95/902; 423/331; 423/598; 423/718
[58] Field of Search ........................ 95/96, 130, 902, 95/138, 117–126, 128, 143–147; 423/326, 331, 598, 709, 713, 718

[56] References Cited

U.S. PATENT DOCUMENTS

| | | | |
|---|---|---|---|
| 4,801,309 | 1/1989 | Lok et al. ............................ | 95/902 X |
| 4,853,202 | 8/1989 | Kuznicki ............................. | 423/326 |
| 4,938,939 | 7/1990 | Kuznicki ............................. | 423/326 |
| 4,964,889 | 10/1990 | Chao .................................. | 55/58 |
| 5,244,650 | 9/1993 | Kuznicki et al. ................... | 423/713 X |
| 5,294,585 | 3/1994 | Moreau et al. ..................... | 95/130 X |
| 5,453,263 | 9/1995 | Blosser et al. ..................... | 423/713 |
| 5,669,958 | 9/1997 | Baker et al. ....................... | 95/50 |
| 5,688,484 | 11/1997 | Saxton et al. ..................... | 423/709 X |

FOREIGN PATENT DOCUMENTS

| | | |
|---|---|---|
| 0 372 132 | 6/1990 | European Pat. Off. . |
| 0 372 133 | 6/1990 | European Pat. Off. . |

OTHER PUBLICATIONS

Naderi et al., "Phase transformation of microporous titanosilicate ETS–4 into narsarsukite", Zeolites vol. 17 437–443, (1996).

Philippou et al., "Structural investigation of ETS–4", Zeolites vol. 16, 98–107 (1996).

Zeolite Molecular Sieves, Donald W. Breck, Krieger Publishing Company, Malabar, Florida, 1984, p. 636.

Kuznicki et al., "Synthesis and Adsorptive Properties of Titanium Silicate Molecular Sieves", from Synthesis of Microporous Materials—molecular sieves vol. 1, 427–453 (1992).

Primary Examiner—Robert H. Spitzer
Attorney, Agent, or Firm—Stephen I. Miller

[57] ABSTRACT

Novel gas separation agents with precisely and predictably controlled pore sizes within the range of 3–4 Angstrom units and their preparation from ETS-4 by exchange with cations, particularly multivalent cations such as strontium followed by drying and calcination to effect controlled pore shrinkage is disclosed. These novel materials have utility in gas separation processes particularly the separation of nitrogen from a mixture of the same with methane.

44 Claims, 4 Drawing Sheets

FIGURE 1
SORPTION VS TREATMENT TEMPERATURE

FIGURE 2- XRD SPECTRUM OF ETS-4 AND COMPOSITION OF THIS INVENTION

SMALL-PORED CRYSTALLINE TITANIUM MOLECULAR SIEVE ZEOLITES AND THEIR USE IN GAS SEPARATION PROCESSES

This application is a Continuation-In-Part of Ser. No. 08/995,983 filed Dec. 22, 1997, now abandoned.

BACKGROUND OF THE INVENTION

Discovery of molecular sieves containing octahedral framework chains represents an important new branch of molecular sieve science. Reference is made to U.S. Pat. No. 4,853,202 and U.S. Pat. No. 4,938,939 (Kuznicki et al).

ETS-4 described in U.S. Pat. No. 4,938,939, the entire disclosure of which is herein incorporated by reference, is a small-pored titano-silicate molecular sieve containing such chains. ETS-4 is characterized by relatively poor thermal stability in the predominantly sodium exchange form in which it is typically synthesized, generally losing substantial structure and porosity near its dehydration temperature of approximately 200° C. However, it is reported in U.S. Pat. No. 4,938,939, that "Members of the family of molecular sieves designated ETS-4 in the rare earth-exchanged form have a high degree of thermal stability of at least 450° C. or higher depending on cationic form, . . . . "

The thermal instability of the as-synthesized forms of ETS-4, usually mixed sodium and potassium forms, or of the sodium form of ETS-4 is disclosed in Kuznicki et al, *Synthesis and Absorbent Properties of Titanium Molecular Sieves*, appearing in *Molecular Sieves*, Edited by Occelli et al, Van Nostrum Reinhold, New York, 1992, pgs. 427–443, Philippou, A., Anderson, M. W. Zeolites, Vol. 16, 1996. pgs. 98–107. and Naderi. M., Anderson, M. W. Zeolites. Vol. 17. 1996, pgs. 437–443.

Water must generally be removed from a molecular sieve zeolite before it can be effectively employed as a sorbent. It is obvious that a dehydrated sieve will have limited utility as a sorbent unless it is stable at and beyond the temperature at which it is dehydrated.

It has been reported that a phase transformation in ETS-4 occurs at 500–700° C. This change is attributed to the formation of narsarsukite. The regime between drying at approximately 200° C. and narsarsukite formation at higher temperatures has been reported to be essentially XRD amorphous for the sodium form of ETS-4. Reference is made to Naderi. M. and Anderson, M. W. Zeolites, Vol. 17, 1996, pgs. 437–443.

In the process of this invention, systematic pore size reduction results in an entirely new zeolite and progresses smoothly and may be frozen at a desired point by cooling the material and quenching the process. This new zeolite retains substantial porosity as measured by its ability to sorb water and other molecules.

SUMMARY OF THE INVENTION

This invention is concerned with crystalline titanium molecular sieve zeolites hereafter referred to as CTS-1, having a pore size of about 3–4 Angstroms and having a composition in terms of mole ratio of oxides as follows:

1.0±0.25 $M_{2/n}O:TiO2:ySiO2:zH2O$ wherein M is at least 1 cation having a valence n, y is 1–10 and z is from 0–10 and more preferable 0–5, and characterized by an X-ray powder diffraction pattern having the lines and relative intensity set forth in Table 1 below.

TABLE 1

| D-spacings (Angstroms) | I/I$_o$ |
|---|---|
| 11.4 ± 0.25 | Very Strong |
| 6.6 ± 0.2 | Medium-Strong |
| 4.3 ± 0.15 | Medium-Strong |
| 3.3 ± 0.07 | Medium-Strong |
| 2.85 ± 0.07 | Medium-Strong | wherein very strong equals 100, medium-strong equals 15–80.

In order to assure that the characteristic XRD pattern set forth in Table 1 is obtained, it is preferred that care be taken to ensure that samples remain dry after activation and throughout analysis. This is because some samples are less stable to rehydration and may be affected by moisture in ambient air. In most cases, such precautions are unnecessary because samples, especially those samples of low alkali metal content rehydrate only very slowly, sometimes over periods of years. A completely dry sample ensures that the proper XRD pattern will be obtained for both stable and metastable materials as such will be later defined. The above values and values later mentioned were collected using standard techniques on a Philips APD3720 diffractometer equipped with a theta compensator using an internal mica standard (SRM675). The theta compensator maintains a constant area of illumination on the sample, so X-ray intensities obtained from a theta compensated unit are not directly comparable to those of a non-compensated unit. Thus, all values mentioned in the specification and claims with regard to CTS-1 were determined by said theta compensated X-ray equipment. The radiation was the K-alpha doublet of copper, and a scintillation counter spectrometer was used. The peak heights, I, and the positions as a function of 2 times theta, where theta is the Bragg angle, were read from the spectrometer chart. From these, the relative intensities, 100 I/I$_o$, where I$_o$ is the intensity of the strongest line or peak, and d (obs.), the interplanar spacing in A, corresponding to the recorded lines, were calculated.

It should be understood that this X-ray diffraction pattern is characteristic of all the species of CTS-1 compositions although it has been seen that in certain alkali metal cation forms of CTS-1, especially the pure sodium form, the 6.6±0.25 line becomes the most intense.

As can be seen by a comparison of U.S. Pat. No. 4,938,939, Table 1 as well as col. 12, lines 10–14, to Table 1 of the instant invention, the novel crystalline titanium molecular sieves of this invention, herein named CTS-1, differs significantly from ETS-4. Thus, for example, in the CTS-1 zeolites of this invention, the strongest line is most always the 11.4±0.25 whereas the strongest line in ETS-4 is typically expected to be the 2.98±0.05 line.

In addition, the novel materials of this invention have lines of relative intensities ranging from medium to strong at the d-spacings indicated.

The novel CTS-1 zeolites of this invention are prepared by treating certain cation exchanged forms of ETS-4, preferably the strontium or calcium form, at temperatures ranging from about 200° C. to about 450° C. at periods of time ranging from ½ hour to about 100 hours or longer.

Depending on the particular temperature chosen for the specific cationic content of ETS-4, a novel zeolite is produced and the pore size can be predictably generated in the size regime of approximately 3–4 Angstroms (diameter). These precisely controlled pores may be used to separate gas molecules of slightly different sizes by the so-called "molecular sieve" effect.

Using the novel CTS-1 zeolites of this invention, materials may be generated using increasing thermal treatments which systematically size-exclude ethane (about 3.6 to above 4 Angstroms), methane (about 3.8 Angstroms), argon (about 3.7 Angstroms), $N_2$ (about 3.6 (Angstroms), $O_2$ (about 3.5 Angstroms), carbon dioxide (about 3.3 Angstroms) and water (about 2.7 Angstroms). Except for argon, these sizes are Lennard-Jones kinetic diameters from *Zeolite Molecular Sieves*, Donald W. Breck. Krieger Publishing Company, Malabar, Fla., 1984, p. 636. This reference lists argon as 3.4 Angstroms, but our size exclusion data repeatedly shows it behaves in a sieving system as being between 3.8 and 3.6 Angstroms. Using these novel zeolites, effective separations include but are not limited to nitrogen from methane, $O_2$ from argon, and $O_2$ from $N_2$. Each of these separations may represent the heart of a significant commercial process.

In addition, mixtures of two or more other molecules in the 3–4 Angstroms range would also be expected to show size exclusions and potential for separations utilizing the appropriately pore sized novel CTS-1 zeolites of the invention.

Similarly, one would anticipate that a gaseous molecule having a molecular diameter greater than about 4 Angstroms could be separated from a gaseous molecule having a molecular diameter in the 3–4 Angstrom range utilizing an appropriately pore sized novel CTS-1 zeolite of the invention.

The presently preferred commercial process is the separation of nitrogen from methane, particularly nitrogen from natural gas wells.

As pointed out in U.S. Pat. No. 5,669,958, a significant percentage of U.S. natural gas reserves contain more than 4% nitrogen. The bulk of these reserves cannot be exploited because no economical technology exists for removing the nitrogen.

Cryogenic distillation is the only process being used to date on any scale to remove nitrogen from methane in natural gas. Cryogenic plants are not used more widely because they are expensive and complicated.

There has been mention of the use of natural zeolites such as clinoptilolites in the various cationic forms for the removal of nitrogen, i.e., see U.S. Pat. No. 4,964,889. The fact remains that there is a need for an improved process of separating nitrogen from methane, particularly from natural gas wells, utilizing molecular sieve technology.

DESCRIPTION OF PREFERRED EMBODIMENTS

The CTS-1 zeolites of this invention and their use in gas separation processes are the result of an entirely heretofore unappreciated and unrecognized transformation of ETS-4 into the novel CTS-1 zeolites.

Prior to this invention it was unnoticed and thus unappreciated that as ETS-4 is carefully thermally treated, large yields of a pure, new material are obtained and that this material possesses uniform pore dimensions which can be controlled by the combination of cation and thermal treatment to provide useful steric separations.

Thus the existence of novel CTS-1 zeolites possessing uniform pore dimensions which can be controlled by the combination of cation exchange and thermal treatment were not available to provide useful steric separations.

It has now been discovered that ETS-4 can be transformed into CTS-1 by the heating of ETS-4, preferably strontium or calcium with or without low levels of sodium, at temperatures ranging from about 50° C. to 450° C., or preferably 200° C. to 350° C. for strontium and/or calcium mixed with sodium for ½ to 100 or more hours, preferably 24–48 hours, then cooling the thus treated material in order to lock in the desired pore size.

The manner of cooling is not critical and it can be accomplished in air, vacuum or inert gas either slowly or rapidly.

The calcination temperature used to achieve a desired pore diameter depends on the cations present in the reagent ETS-4. Although multivalent strontium and calcium are the preferred cations for CTS-1 for natural gas separations, other cations can be used with appropriate changes of temperature and duration of thermal treatment. Various combinations of Sr, Ca, Li, Mg, Na, H, Ba, Y, La, and/or Zn have all demonstrated $N_2/CH_4$ selectivities.

Although the novel materials of this invention have been prepared from the calcium and strontium form of ETS-4, there is no theoretical reason why other cations could not be used with appropriate changes of temperature and duration of thermal treatment. Additionally, the novel materials of this invention can be back-exchanged with metal, ammonium or hydrogen ions in a conventional manner if such is desired.

In the case of materials in which all or substantially all of the exchangeable cations are alkali metals or combinations thereof, the materials must be dry before calcination, i.e., less than about 10 wt. % water and calcination should be in a dry environment, i.e., less than 20% relative humidity, and more preferably, as dry as possible. Also, during use in a gas separation process, the dry alkali metal forms of the material must be used with a gas that is dry. Thus, the stability of the material in which all or substantially all exchangeable cation are alkali metal are adversely affected by exposure to water. With these alkali metal forms as well as other exchanged forms, the amount of CTS-1 generated is affected by the temperature and time involved during preparation and use.

The degree of desired ion exchange is not narrowly critical and it is preferred to exchange the ETS-4 with said cations, i.e., preferably calcium or strontium, to a point at which at least the exchange cation represents 50% of the total cations, more preferably 60% of the total cations, and even more preferably at least 80% of the total cations. Note that even within the family of differing Na/Sr ratios, there will be a unique calcination temperature to form a desired pore size for each cation ratio.

As has been previously stated, the novel zeolites of this invention are prepared by thermal treatment of ETS-4 in order to cause the crystalline lattice of ETS-4 to contract into the novel CTS-1 zeolite. It is noted that the thermal treatment and the particular cations associated with the ETS-4 are extremely critical in obtaining the CTS-1 zeolites. Thus, virtually all ionic forms of ETS-4 may be contracted to CTS-1 under appropriate conditions. However, the resulting CTS-1 obtained varies widely with regard to its sensitivity to moisture.

Thus, it is possible to produce a novel crystal structure which can be reverted back to its old crystal structure by exposing the contracted structure to moisture.

The relative ease at which CTS-1 can be converted back to ETS-4 shall be referred to as "crystalline stability" as opposed to "thermal stability" and will further be defined as "stable" or "metastable".

Thus, even as synthesized Na ETS-4 may be converted to CTS-1 and under the right circumstances can effectively separate nitrogen from methane and other gas combinations. However the conversion of ETS-4 to CTS-1 may be "stable" or "metastable" depending on the cationic and thermal conditions used to contract the original material. Metastable CTS-1 may revert back to ETS-4 slowly over a period of weeks or more, or rapidly as fast as rehydration from moisture in the air can occur depending upon the alkali metal content of the ETS-4 which is contracted. Thus, in a situation where cations associated with the ETS-4 are predominately alkali metal cations, the CTS-1 so produced can convert quickly to ETS-4 upon exposure to the moisture in air. Thus, for example, if sodium ETS-4 is heated at temperatures as low as 100° C. to 125° C., CTS-1 will be produced. However, the pure sodium material will reexpand to ETS-4 instantaneously upon rehydration. Dehydrated sodium ETS-4 is seen to shrink to CTS-1 during drying in an in-situ high temperature XRD chamber. However, in the same chamber, the crystal structure reexpands to ETS-4 rapidly upon exposure to humid ambient air.

Thus, if CTS-1 prepared from pure sodium ETS-4 were to be used for separating nitrogen from methane, the material must be kept free from exposure to humid ambient air—even when it is being used in the actual separation.

CTS-1 materials which revert back to ETS-4 upon exposure to moisture will be referred to as "metastable". One measure of a metastable CTS-1 depends on the alkali metal content of the ETS-4 which is thermally treated. If at least 50% to 75% of the cationic sites of ETS-4 are represented by alkali metals with the balance being alkaline earth cations, then a metastable CTS-1 will be obtained after thermal treatment. The amount of time that it takes for the CTS-1 to revert back to ETS-4 upon exposure to moisture is inversely proportional to the alkali metal content of the original ETS-4 used to prepare CTS-1.

As indicated earlier, the permanence of the conversion of ETS-4 to CTS-1 is extremely cation and treatment temperature dependent. In cases where monovalent/divalent cation mixtures are used, the degree of stability increases with divalent content and the combined effect of time and temperature. Samples which are predominantly monovalent revert to ETS-4 upon rehydration. Samples which are predominantly divalent (especially strontium) have been observed to be stable for periods exceeding one year.

Thus, a stable CTS-1 as opposed to a metastable CTS-1 is a crystalline structure that does not revert back to ETS-4 upon hydration for periods of time in excess of months.

Both the stable and metastable forms of CTS-1 have the characteristic X-ray diffraction pattern set forth in Table 1 but for obvious reasons, the stable CTS-1 is more preferred over the metastable CTS-1 due to its greater resistance upon exposure to moisture whether it be from air or during use of various absorption processes.

As stated earlier, the preferred cations used to prepare CTS-1 are divalent cations, in particular calcium, zinc, and especially strontium. ETS-4 which has had substantially all of its original alkali metal cations replaced with calcium, zinc, strontium, or mixtures thereof can be converted to stable CTS-1 by thermal treatment at around 300° C. or higher.

Note that, even a divalent exchanged ETS-4 which has been heated to temperatures less than 300° C. might very well revert to CTS-1, but convert back to ETS-4 upon prolonged exposure, (i.e., hours or weeks), to water. Unlike the situation previously described with regard to the use of monovalent metal cations, this conversion is not instantaneous.

Trivalent ion exchanged ETS-4, i.e., yttrium or lanthanum ETS-4, has been observed to form substantial concentrations of CTS-1 upon simple drying at 100° C. Thus, high valency ions appear to promote formation of stable CTS-1, even where alkali metal cations exceed 25%.

The ETS-4 which is used as the starting material can be prepared in accordance with the teachings of U.S. Pat. No. 4,938,939 wherein halide-containing reagents are used or it can be prepared from reaction mixtures which are free from halide containing reactants in a manner analogous to the preparation of ETS-10 set forth in U.S. Pat. No. 5,453,263, the entire disclosure of which is incorporated herein by reference.

When used as a sorbent, it is desired to incorporate the new crystalline titanium silicate CTS-1 with another material resistant to the temperatures and other conditions employed in separation processes. Such materials include inorganic materials such as clays, silica and/or metal oxides. The latter may be either naturally occurring or in the form of gelatinous precipitates or gels including mixtures of silica and metal oxides. Normally crystalline materials have been incorporated into naturally occurring clays, e.g., bentonite and kaolin, to improve the crush strength of the sorbent under commercial operating conditions. These materials, i.e., clays, oxides, etc., function as binders for the sorbent. It is desirable to provide a sorbent having good physical properties because in a commercial separation process, the zeolite is often subjected to rough handling which tends to break the sorbent down into powder-like materials which cause many problems in processing. These clay binders have been employed for the purpose of improving the strength of the sorbent.

Naturally occurring clays that can be composited with the crystalline titanium silicate described herein include the smectite, palygorskite and kaolin families, which families include the montmorillonites such as sub-bentonites, attapulgite and sepirotite and the kaolins in which the main constituent is halloysite, kaolinite, dickite, nacrite or anauxite. Such clays can be used in the raw state as originally mined or initially subjected to calcination, acid treatment or chemical modification. The relative proportions of finally divided crystalline metal titanium silicate and inorganic metal oxide can vary widely with the crystalline titanium silicate content ranging from about 1 to 99 percent by weight and more usually in the range of about 80 to about 90 percent by weight of the composite.

In addition to the foregoing materials, the crystalline titanium silicate may be composited with matrix materials such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel.

The present invention can be performed by virtually any known adsorption cycle such as pressure swing (PSA), thermal swing, displacement purge, or nonadsorbable purge (i.e., partial pressure reduction). However, the process of the present invention can be advantageously performed using a pressure swing cycle. Pressure swing cycles are well known in the art.

If it is desired to separate nitrogen from methane, then it is desirable to utilize a pressure swing type process at a temperature and pressure effective for adsorption and desorption of nitrogen, with the temperature being preferably maintained in the range of from about −50° to +100° C., and more preferably from 0° to 70° C., the pressure during adsorption being from about 20 psia to 2000 psia, and preferably about 100–1500 psia and more preferably from 300–1000 psia, and the pressure during desorption being lower than during adsorption and effective to cause the desorption of nitrogen, preferably from about 0.1 torr to 150 psia, more preferably from about 0.1 torr to 50 psia and most preferably from about 0.1 torr to 25 psia. The cyclic process can comprise additional adsorption and regeneration steps as well as intermediate depressurization and purging steps.

EXAMPLE 1

Preparation of ETS-4

An alkaline titanium silicate gel was prepared. A sodium silicate solution was prepared using N®-Brand sodium silicate (28 wt. % $SiO_2$, 9 wt % $Na_2O$) and caustic (38 wt. % $Na_2O$ solutions. A separate titanic sulfate solution was prepared using titanic sulfate (10 wt % $TiO_2$, 38 wt. % $H_2SO_4$), sulfuric acid, and deionized water. The sodium silicate and titanic sulfate solutions were mixed together using a high shear mixer forming a gel. The final pH of the undiluted gel was 11.5. Molar ratios of the gel composition are stated in Table 2. The gel was autoclaved at autogenous pressure in an unstirred TEFLON® lined vessel for 5 hours in an oven preheated to 230° C., then quenched in cold water. The white crystallized product was settled to the bottom of the autoclave liner under a clear supernatant liquid. The desired solid product was filtered and washed with deionized water to remove undesired salt byproducts, then dried at 115° C. for 1 hour at ambient pressure in air.

TABLE 2

| Molar ratios used in the synthesis gels of ETS-4 | | | |
| --- | --- | --- | --- |
| Si/Ti | $H_2SO_4$/Ti | $Na_2O/H_2SO_4$ | moles Ti/1000 g gel |
| 3.00 | 3.474 | 1.371 | 0.220 |

Elemental analysis of the resultant crystalline ETS-4 produced the following results by X-Ray fluorescence analysis, using lithium tetraborate fusion.

| | Wt. % |
| --- | --- |
| $SiO_2$ | 53.1% |
| $TiO_2$ | 27.0 |
| $Na_2O$ | 19.6 |
| $K_2O$ | <0.1 |

EXAMPLE 2

Preparation of Strontium-exchanged ETS-4

The ETS-4 product of Example 1 was exchanged to the strontium ETS-4 form by mixing 100 g of the as-made material with 300 g of $SrCl_2$ in 3 liters of water, heating to a boil, mixing for ½ hour and washing with a large excess of deionized water. This process was repeated two more times for a total of three exchanges. Elemental analysis of the strontium exchanged material yielded the following results by XRF:

| | Wt. % |
| --- | --- |
| $SiO_2$ | 50.0 |
| $TiO_2$ | 22.1 |
| SrO | 26.9 |
| $Na_2O$ | 0.5 |
| $K_2O$ | <0.1 |

As can be seen from the above example, more than 90% of the original Na of the as-prepared ETS-4 of Example 1 was removed by this strontium exchange process.

The above material had an XRD pattern characteristic of ETS-4 as referenced in U.S. Pat. No. 4,938,939.

EXAMPLE 3

Preparation of CTS-1

Strontium exchanged ETS-4 as prepared in Example 2 was calcined in air in a Rheometric Gravimetric Absorption system, held at temperature for 16 hours under a flow of dry air at 250° C., 300° C. and 340° C.

Samples were then brought to ambient temperatures and the air stream was humidified to 22 Torr $H_2O$ vapor pressure.

Figure 1:
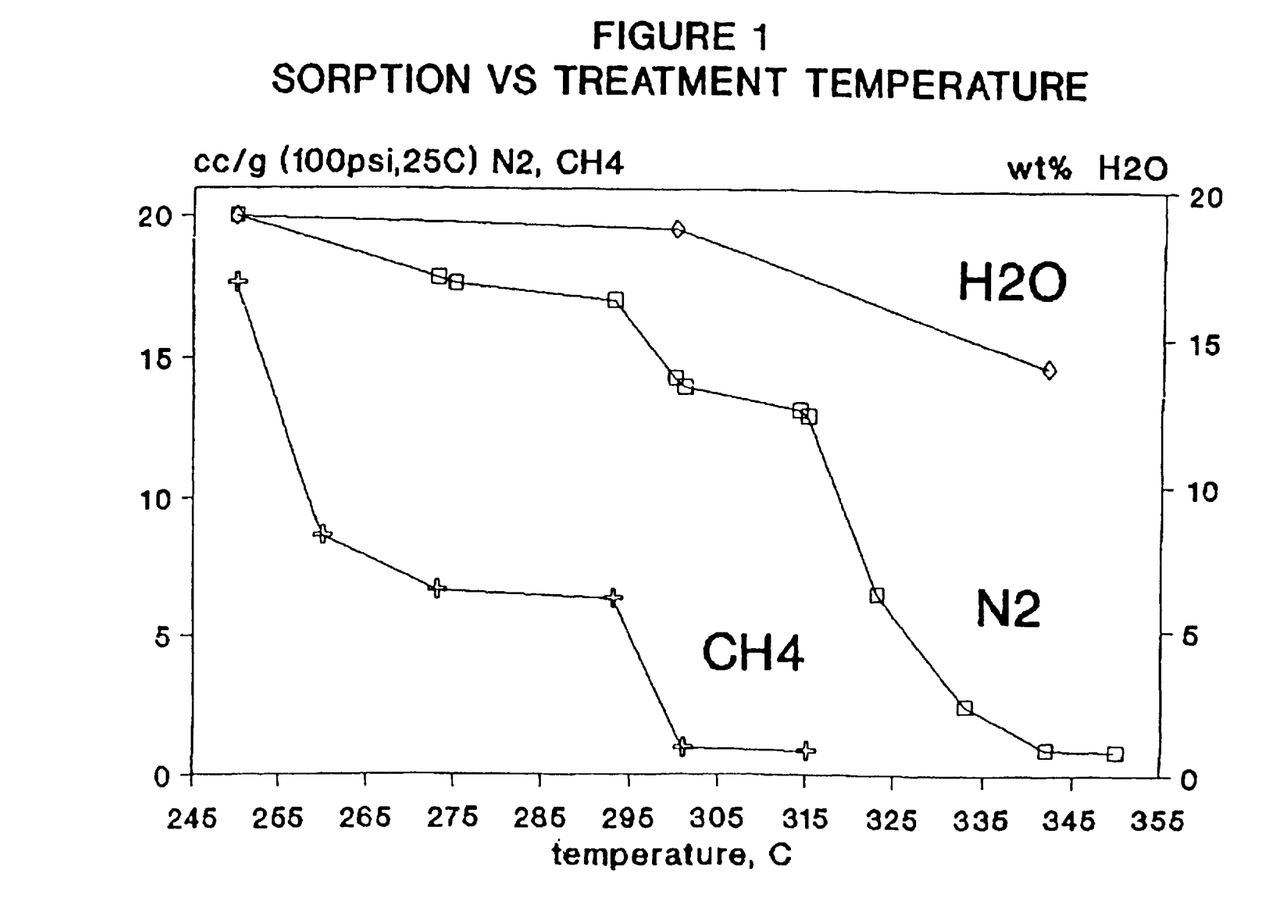
FIG. 1 is a graph plotting the sorption of $N_2$, $CH_4$ or $H_2O$ for strontium-exchanged ETS-4 samples after different calcination temperatures and formation of CTS-1. $H_2O$ values were measured at 22 Torr, 25° C., after a sample was calcined in a gravimetric system for 16 hours under a flow of dry air at 250° C., 300° C. and 340° C. $N_2$ and $CH_4$ values were obtained at 25° C., 100 psia on a VTI Corporation High Pressure Volumetric system after a minimum 16 hour calcination under vacuum to a pressure at or below $1\times10^{-3}$ Torr.

As set forth in FIG. 1, the weight gain of the strontium exchanged material upon hydration was measured gravimetrically and found to be 20% for the samples treated at 250° C. and 300° C. and nearly 15% for the sample treated at 340° C.

Figure 2:
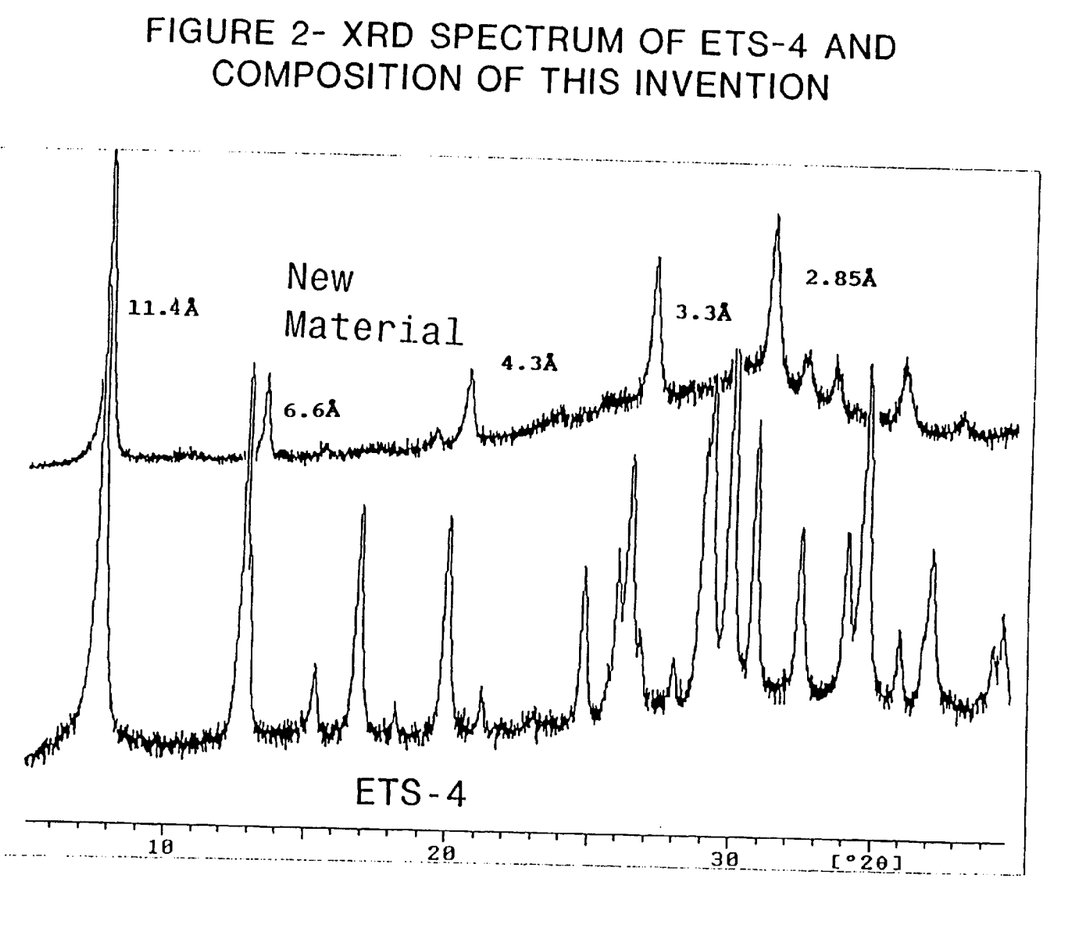
FIG. 2 shows XRD spectra for NaETS-4 and strontium CTS-1 prepared by treating strontium ETS-4 at 300° C. in vacuum for 60 hours with formation of CTS-1. As can be seen from FIG. 2, the novel materials of this invention have the X-ray lines and intensities set forth in Table 1 and are distinctly different from the starting ETS-4.

The materials treated at 300° C. or 340° C. are indeed novel CTS-1 of this invention as seen in their XRD patterns which are consistent with the materials of this invention as presented in Table 1 and depicted in FIG. 2. As can be seen from the water absorption data of FIG. 1, these novel materials retain their porosity as measured by water sorption after formation of this new zeolite. The sample treated at 250° C. is partially converted to the CTS-1 novel material of this invention as indicated by its XRD pattern which is intermediate between ETS-4 and CTS-1.

Nitrogen and methane absorption tests were also carried out. The strontium exchanged ETS-4 of Example 2 was converted to CTS-1 by thermal treatments under vacuum a minimum of 16 hours at temperatures ranging from 250° C. to 350° C., as presented in FIG. 1. The nitrogen and methane uptakes at 25° C. and 100 psia are shown in FIG. 1.

As can be seen from FIG. 1, the novel material which had been treated at 300° C. showed a preferential absorption of nitrogen over methane. This demonstrates that the pore size of the CTS-1 had shrunken such that it preferentially admitted nitrogen over methane.

However, by a temperature of 340° C., the absorption of both methane and nitrogen had ceased, showing that the pore size had shrunken still further.

Conclusions From FIG. 1

While the preponderance of sorption capacity for the smallest molecule, water (about 2.6 Angstroms) is retained for the temperature range tested, the capacity of larger molecules, such as methane (3.8 Angstroms) and nitrogen (3.6 Angstroms) declined systematically with calcination temperature, methane being essentially nonabsorbed by 300° C. and nitrogen by 340° C. This indicates that essentially all the pores as large as 3.8 Angstroms are removed by the 300° C. calcination and that essentially none as large as 3.6 Angstroms exist by the 340° C. calcination even though high internal void volume was retained as indicated by the retained water capacity.

Thus these experiments, as presented in FIG. 1, indicate a systematic reduction in pore size with calcination temperature.

It is to be noted that, in molecular sieve zeolites which have pore sizes large enough to admit both nitrogen and methane, thermodynamically methane adsorption is always favored over nitrogen. As shown in FIG. 1, the CTS-1 zeolites of this invention demonstrate preferential absorption of nitrogen and can be used in purifying natural gas.

As is known in the prior art, natural gas streams frequently contain components smaller than nitrogen, such as water vapor, carbon dioxide and hydrogen sulfide. The gas stream to be treated in accordance with the novel process of this invention preferably would have these contaminants removed prior to treatment of the gas stream with the novel CTS-1 zeolites of this invention.

EXAMPLE 4

Figure 3:
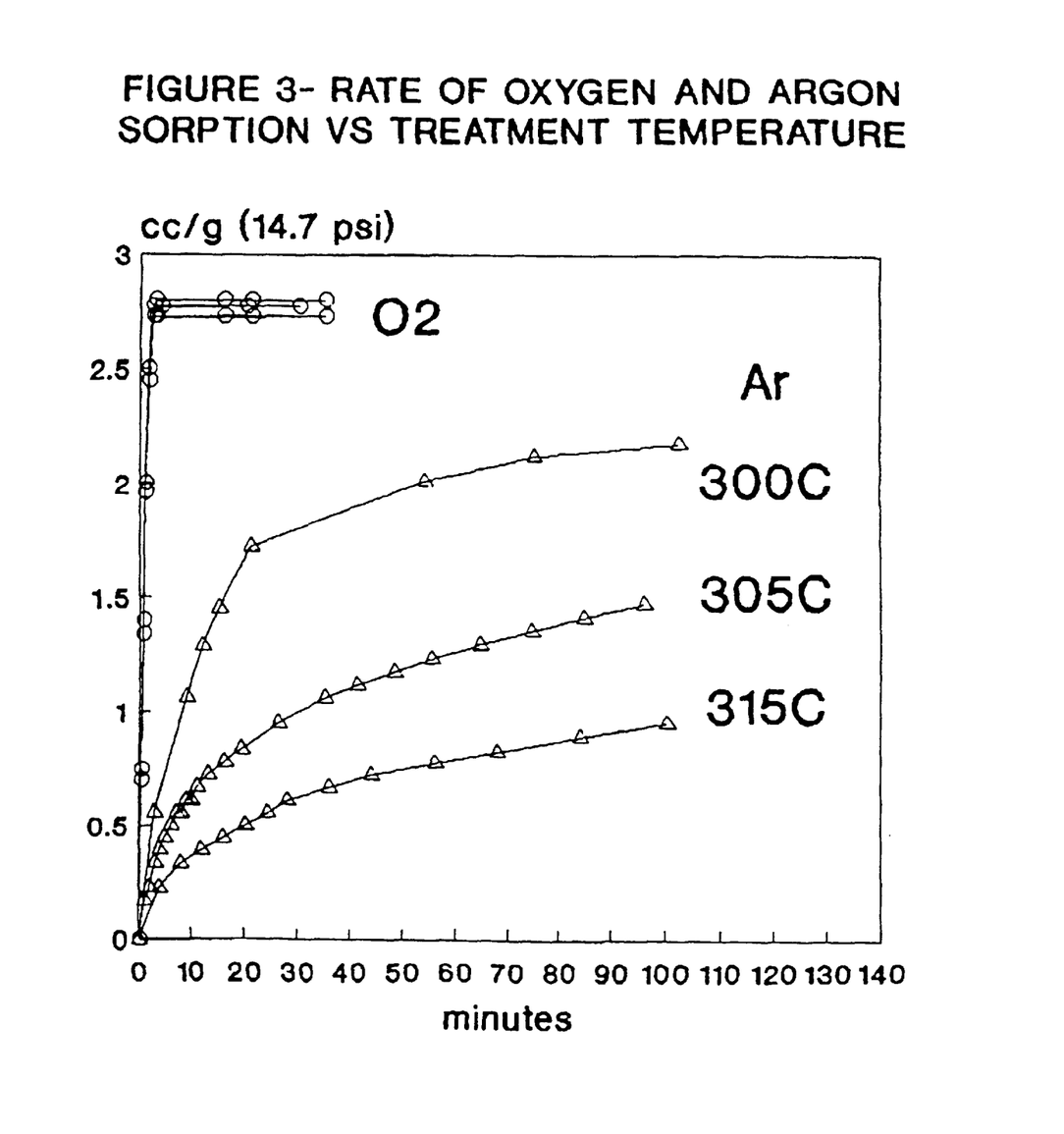
FIG. 3 shows the rate of $O_2$ and Ar sorption by CTS-1 at 25° C. and 14.7 psia (1 atmosphere) as a function of the calcination temperature applied to strontium ETS-4.

Dramatic differences in rates of sorption as pore sizes approach that of the potential adsorbate would be expected if pore sizes were essentially completely uniform. Rate of uptake curves for oxygen and argon were obtained by heating strontium-exchanged ETS-4 to form CTS-1 under vacuum at 300°, 305° and 315° C. for 16 hours, thus preparing CTS-1 of slightly differing pore sizes, on a VTI Corporation gravimetric microbalance system. After cooling to 25° C. under vacuum, the samples were exposed to either $O_2$ or Ar by increasing pressure from 0 to 14.7 psia. The corresponding sample weight increases vs time are shown in FIG. 3. The absorption rate for argon (~3.7 Angstroms) declines drastically after calcination slightly above 300° C., while the smaller oxygen (~3.5 Angstroms) is essentially unaffected. Oxygen and argon are not differentiated thermodynamically by most sieves. The geometric separation, as is evident in this example, is potentially valuable in oxygen purification or argon generation.

EXAMPLE 5

Figure 4:
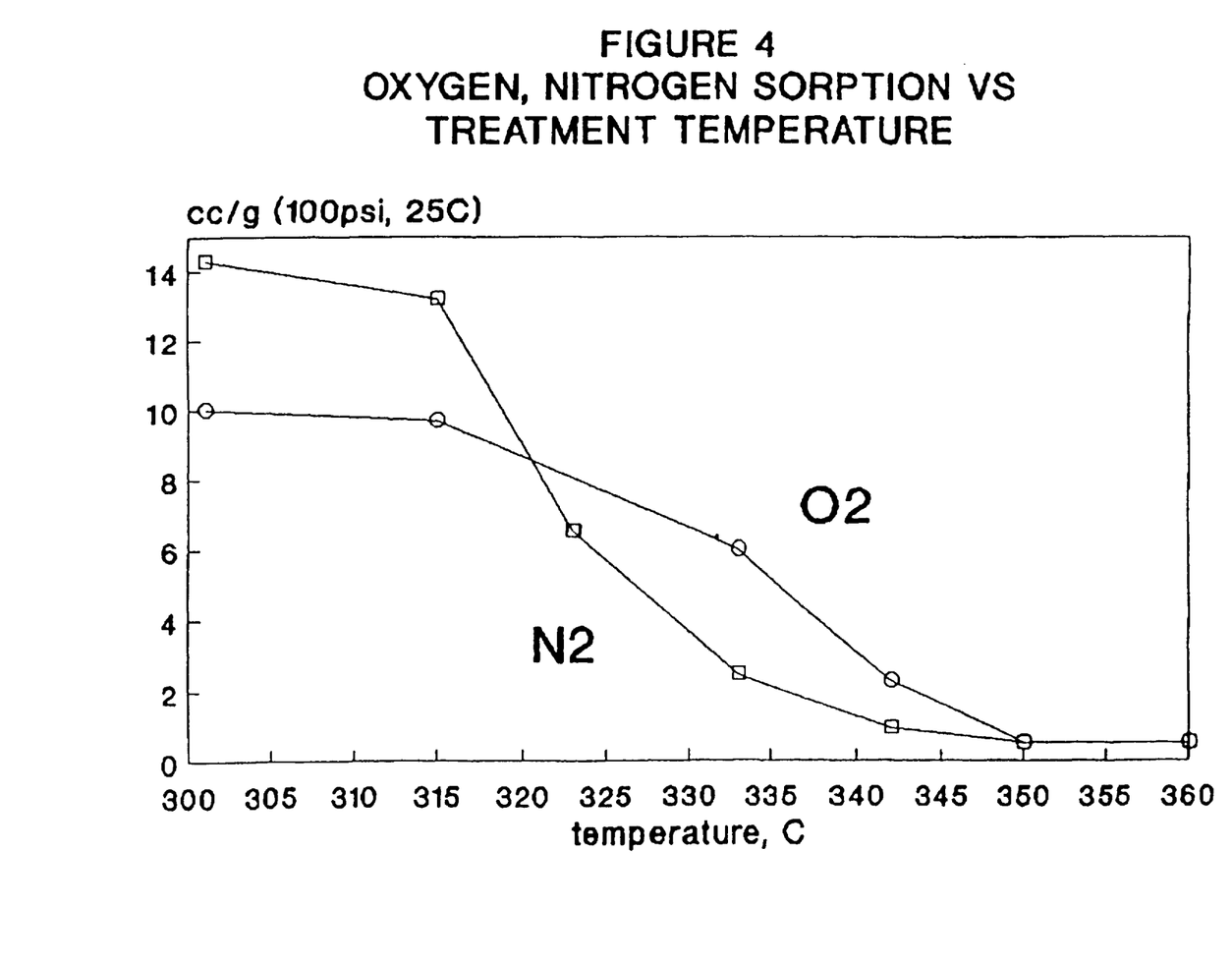
FIG. 4 shows comparative O2 and N2 sorption by CTS-1 at 100 psia and 25° C. as a function of the calcination temperature applied to strontium ETS-4.

If pore sizes continue to shrink with increasing temperature treatment, one would expect to see the normal thermodynamic selectivity that zeolites invariably express towards nitrogen over oxygen to be reversed by a geometric effect at some point. This is what is observed in the data presented in FIG. 4 as the calcination temperature of strontium ETS-4 is increased from 300 to 340° C. to form CTS-1 of further decreased pore size. Sorption measurements taken at room temperature and at 100 psia using a VTI Corporation volumetric system are presented in FIG. 4 where nitrogen is shut out at a lower temperature than the smaller $O_2$ as the treatment temperature is increased in this regime. Such selectivity towards the lesser component of air provides a new avenue for use in air separation.

EXAMPLE 6

A representative sample of CTS-1 was prepared by exchanging ETS-4 with strontium as in Example 2. The SrETS-4 was extruded with 20% sodium bentonite as a binder, and converted to CTS-1 by calcination at 315 C in flowing nitrogen in a 1-inch bed in a stainless steel pan for 20 hours. This material was then loaded into a 5-foot column and dried at 230° C. using a flow of dry nitrogen at 50 liters per minute for 8 hours. After cooling to room temperature, the pressure was raised to 1000 psig under helium flow. The feed gas was then changed to a mix of 75% methane/25% nitrogen. The effluent was essentially pure helium for about 3 minutes, then pure methane for over 3 minutes while the nitrogen was preferentially adsorbed in the column. The concentration exiting the column dropped back to feed concentration once the N2 capacity was reached.

In another test, the separation was carried out at a pressure of 400 psi and it gave 5 minutes of pure methane before requiring regeneration. This example demonstrates that $N_2$ may be removed from CH4 in the high pressure regime most desirable for natural gas purification.

EXAMPLE 7

Preparation of Calcium CTS-1

In order to demonstrate that CTS-1 may be prepared in forms other than strontium, CaETS-4 was prepared and transformed to CTS-1. The exchange process of Example 2 was repeated with the exception that calcium chloride was employed in place of the strontium chloride. The calcium exchanged material had an XRD pattern characteristic of ETS-4 as referenced in U.S. Pat. No. 4,938,939.

The CaETS-4 was transformed to CTS-1 by heating in air at 300° C. for a period of 24 hrs. The resultant material was clearly CTS-1 as evidenced by an XRD pattern consistent with Table 1 and FIG. 2 of this invention. A sample of this material was employed as the packing of a gas chromatograph column. Using helium as carrier gas, injection of $N_2/CH_4$ mixtures repeatedly resulted in no methane retention or adsorption, while $N_2$ showed substantial adsorptivity. A material with such characteristics could be employed in the removal of methane from natural gas.

EXAMPLE 8

In order to demonstrate that CTS-1 of a desired pore diameter can be prepared with alkali, alkaline, lanthanide or transition metals with cation valences of +1 to +3, Table 3 shows the CTS-1 products prepared using the ETS-4 of Example 1, exchanged using the procedure of Example 2, and the CTS-1 (using the vacuum heat treatment) formation procedure of Example 3. The calcination temperatures listed in Table 3 are those where the CTS product causes nitrogen equilibrium adsorption at 100 psi to exceed the methane equilibrium adsorption at 100 psi. A range of +/−20° C. allows for differences in initial sample dryness and size, equipment variations and drying times. At temperatures approximately 30° C. above those listed, each sample also demonstrates nitrogen/oxygen selectivity. The one exception is HCTS-1 where high temperature instability interfered with this measurement. This confirms that all these cation forms follow the same pore shrinkage trend seen in FIG. 1 for SrCTS-1.

TABLE 3

| cation(s) | cation ratio | temperature ° C. N2>CH4 |
|---|---|---|
| HNa | 95:5 | 90 |
| LiNa | 80:20 | 110 |
| NaLa | 78:22 | 125 |
| Na | 100 | 125 |
| NaY | 80:20 | 135 |
| YNa | 88:12 | 135 |
| KNa | 68:32 | 155 |
| NaMg | 70:30 | 250 |
| SrMgNa | 80:15:5 | 285 |
| CaNa | 98.2 | 290 |
| SrNa | 94.6 | 300 |
| Sr | 100 | 320 |
| ZnNa | 97.3 | 325 |
| BaNa | 97:3 | 475 |

EXAMPLE 9

The pore shrinkage is a function of both the treatment temperature and time. This can be clearly seen when the sodium ETS-4 sample of Example 8 is heated to a much higher temperature, but for a much shorter time. A sample of this NaETS-4 was dried at 80° C. overnight, then placed in a hot, 300° C. oven for ½ hour. The XRD pattern of the resultant material indicated the presence of substantial amounts of stable small pored CTS-1.

EXAMPLE 10

Preparation of 10% Bentonite Bound 75/25(Sr/Na) ETS 4 Beads(12/40 Mesh)

This example will illustrate a procedure for the incorporation of CTS-1 in a binder.

1,715 g of 75/25 equivalent (Sr/Na)ETS4 powder were added to the bowl of a 12" diameter Eirich blender (Model #R02). This equals 1,650 g (dry basis) as determined by an OHAUS® moisture analyzer (Model #6010PC). Next, 196.1 g of bentonite clay powder (VOCLAY® SPV 200) were added to the Eirich bowl. This equals 156.9 g (dry basis) as determined by the OHAUS® moisture analyzer. These two dry powders were then mixed for ~10 minutes on the low rotation setting #1 and low agitation setting #I.

Distilled water was then added to the blended powder while still mixing on the low rotation and agitation settings. The water was added a portion at a time, with reduced amounts being added as the mixture got "wetter". The total amount of water added was 1,550 g. The bowl was then rotated on the high setting #II until mostly "oversized", i.e., >+12 Mesh sized, product was obtained. Occasionally, the agitator was turned on (at the low setting #1) to reduce larger chunks. The resulting "oversized" beads were dried @110° C. overnight, then reworked as follows:

Distilled water was added to the dried beads while mixing on the low rotation and agitation settings. Again, the water was added a portion at a time, with reduced amounts being added as the mixture got "wetter". 1,260 g of water was added during this step. The bowl was then rotated on the high setting #II until mostly −12/+40 Mesh product was obtained. Occasionally, the agitator was turned on (at the low setting #I) to reduce the larger beads. "Oversized" beads were separated by screening with a 12 Mesh screen then reworked. When the entire product passed through the 12 Mesh screen, it was dried overnight @100° C. The dried beads were then classified using −12/+40 Mesh screens. The total weight of dried −12/+40 Mesh beads obtained was 1,196 g (66% yield).

What is claimed is:

1. A crystalline titanium molecular sieve zeolite having a pore size of approximately 3–4 Angstrom units and a composition in terms of mole ratios of oxide as follows:

$$1.0 \pm 0.25 \ M_{2/n}O:TiO_2:ySiO_2:zH_2O$$

wherein M is at least one cation having a valence n, y is from 1.0 to 10 and z is from 0 to 10, said zeolite being characterized by an X-ray diffraction pattern having the lines and relative intensities set forth in Table 1 of the specification.

2. The zeolite of claim 1 wherein M is predominantly strontium.

3. The zeolite of claim 2 which has a pore size of about 3.6 Angstrom units.

4. The zeolite of claim 2 which has a pore size of approximately 3.8 Angstrom units.

5. A process for the separation of nitrogen from a mixture of the same with methane which comprises contacting said mixture with the crystalline titanium molecular sieve zeolite of claim 2.

6. A process for the separation of oxygen from a mixture of the same with argon which comprises contacting said mixture with the crystalline titanium molecular sieve zeolite of claim 2.

7. A process for the separation of oxygen from a mixture of the same with nitrogen which comprises contacting said mixture with the crystalline titanium molecular sieve zeolite of claim 2.

8. A process for separating a mixture of at least two molecules having molecular diameters of 3–4 Angstroms which comprises contacting said mixture with the crystalline titanium molecular sieve zeolite of claim 2 so as to selectively exclude at least one of said molecules.

9. The zeolite of claim 1 wherein M is predominantly calcium.

10. A process for the separation of nitrogen from a mixture of the same with methane which comprises contacting said mixture with the crystalline titanium molecular sieve zeolite of claim 9.

11. A process for the separation of oxygen from a mixture of the same with argon which comprises contacting said mixture with the crystalline titanium molecular sieve zeolite of claim 9.

12. A process for the separation of oxygen from a mixture of the same with nitrogen which comprises contacting said mixture with the crystalline titanium molecular sieve zeolite of claim 9.

13. A process for separating a mixture of at least two molecules having molecular diameters of 3–4 Angstroms which comprises contacting said mixture with the crystalline titanium molecular sieve zeolite of claim 9 so as to selectively exclude at least one of said molecules.

14. A process for the separation of nitrogen from a mixture of the same with methane which comprises contacting said mixture with the crystalline titanium molecular sieve zeolite of claim 1.

15. A process for the separation of oxygen from a mixture of the same with argon which comprises contacting said mixture with the crystalline titanium molecular sieve zeolite of claim 1.

16. A process for the separation of oxygen from a mixture of the same with nitrogen which comprises contacting said mixture with the crystalline titanium molecular sieve zeolite of claim 1.

17. A process for separating a mixture of at least two molecules having molecular diameters of 3–4 Angstroms which comprises contacting said mixture with the crystalline titanium molecular sieve zeolite of claim 1 so as to selectively exclude at least one of said molecules.

18. The zeolite of claim 1 wherein M is chosen from the group consisting of strontium, calcium, lithium, magnesium, sodium, hydrogen, barium, yttrium, lanthanum and zinc as well as mixtures thereof.

19. The zeolite of claim 1 which has a pore size chosen from the group consisting of 2.7, 3.3, 3.5, 3.6, 3.7 and 3.8 Angstrom units.

20. A process for separating a mixture comprising:
(a) one or more species of gas molecules each of said species having molecular diameters of 4 or less Angstroms; and
(b) one or more species of gas molecules each of said species having molecular diameters greater than 4 Angstroms said process comprising contacting a mixture of (a) and (b) with the crystalline titanium molecular sieve zeolite of claim 1 so as to selectively exclude the components of (b).

21. The process of claim 20 wherein the species of gas molecules in (a) have molecular diameters of about 3–4 Angstroms.

22. The process of claim 21 wherein the species of gas molecules in (a) comprise methane.

23. The process of claim 21 wherein (a) is one species of gas molecule.

24. The process of claim 20 wherein the species of gas molecules in (a) comprise hydrogen.

25. The process of claim 20 wherein the species of gas molecules in (a) comprise water.

26. The process of claim 20 wherein the species of gas molecule in (a) is methane and the species of gas molecules in (b) comprise C-2 and higher hydrocarbons.

27. The process of claim 20 wherein (a) is one species of gas molecule and (b) is one species of gas molecule.

28. A process for separating a mixture comprising:
(a) one or more species of gas molecules each of said species having molecular diameters of 3 or more Angstroms; and
(b) one or more species of gas molecules having molecular diameters of less than 3 Angstroms said process comprising contacting a mixture of (a) and (b) with the crystalline titanium molecular sieve zeolite of claim 1 so as to selectively exclude the components of (a).

29. The process of claim 28 wherein the species of gas molecules in (a) have molecular diameters of about 3–4 Angstroms.

30. The process of claim 29 wherein (a) is one species of gas molecule.

31. The process of claim 29 wherein the species of gas molecule in (b) is hydrogen.

32. The process of claim 28 wherein the species of gas molecules in (b) comprise hydrogen.

33. The process of claim 28 wherein the species of gas molecules in (b) comprise water.

34. The process of claim 28 wherein the species of gas molecules in (a) comprise methane.

35. The process of claim 28 wherein the species of gas molecules in (a) are selected from the group consisting of nitrogen and oxygen and the species of gas molecule in (b) is water.

36. The process of claim 28 wherein the species of gas molecules in (a) are selected from the group consisting of carbon dioxide and carbon monoxide and the species of gas molecule in (b) is hydrogen.

37. The process of claim 28 wherein (a) is one species of gas molecule and (b) is one species of gas molecule.

38. The process of claim 37 wherein the species of gas molecule in (a) is hydrogen sulfide and the species of gas molecule in (b) is ammonia.

39. The process of any one of claims 20 through 38 wherein the cation, M, of the crystalline titanium molecular sieve zeolite is predominately strontium.

40. The process of any one of claims 20 through 38 wherein the cation, M, of the crystalline titanium molecular sieve zeolite is predominately calcium.

41. The process of any one of claims 20 through 38 wherein the cation, M, of the crystalline titanium molecular sieve zeolite is chosen from the group consisting of strontium, calcium, lithium, magnesium, sodium, hydrogen, barium, yttrium, lanthanum and zinc as well as mixtures thereof.

42. A process for preparing a novel crystalline titanium molecular sieve zeolite having a pore size of approximately 3–4 Angstrom units and a composition in terms of mole ratios of oxide as follows:

$$1.0 \pm 0.25\ M_{2/n}O:TiO_2:ySiO_2:zH_2O$$

wherein M is at least one cation having a valence n, y is from 1.0 to 10 and z is from 0 to 10, said zeolite being characterized by an X-ray diffraction pattern having the lines and relative intensities set forth in Table 1 of the specification, which comprises heating ETS-4 at elevated temperatures for a period of time sufficient to convert said ETS-4 to said novel crystalline titanium molecular sieve zeolite.

43. The process of claim 42 wherein M is predominantly strontium.

44. The process of claim 42 wherein M is predominantly calcium.

* * * * *